Feb. 27, 1968  J. C. E. FLINT  3,370,611

SLIDE VALVES

Filed Nov. 19, 1965

INVENTOR
JOHN C. E. FLINT

BY

Orland M. Christensen

ATTORNEY

United States Patent Office 3,370,611
Patented Feb. 27, 1968

3,370,611
SLIDE VALVES
John C. E. Flint, Chalford, England, assignor, by mesne assignments, to Dowty Hydraulic Units Limited, Cheltenham, England
Filed Nov. 19, 1965, Ser. No. 508,794
Claims priority, application Great Britain, Nov. 21, 1964, 47,475/64
2 Claims. (Cl. 137—625.25)

ABSTRACT OF THE DISCLOSURE

A slide valve includes a displaceable member which includes auxiliary ports cut completely through the thickness of the member and each housing members of cylindrical form which are urged into engagement with adjacent casing surfaces by a resilient sealing ring interposed between the members thereby to effect sealing in the vicinity of the auxiliary ports and service ports with which they are in alignment when the displaceable member is in its neutral position.

---

According to this invention a slide valve comprises a casing and a member of rectangular cross-section housed for sliding displacement in the casing to either side of a neutral position, which member includes a central pressure slot of such length as to be in permanent registry with a pressure fluid supply port formed in the casing, and also includes two auxiliary ports cut completely through the thickness of the member, which ports when the member is in its neutral position, respectively register exactly with first and second service ports and also with respective first and second balance service ports provided in the casing, means being provided within at least one auxiliary port for substantially preventing escape of fluid from the service and auxiliary ports to drain or atmosphere.

Where the sealing means are provided within at least one auxiliary port they may comprise cylindrical members, a pair for each port, having a sliding fit with the port and urged outwardly of the port into sealing engagement with the appropriate face of the casing by resilient means interposed between them.

The resilient means may comprise a sealing ring having such inherent resilience as to urge the two cylindrical members apart and be of such shape as for example, of circular cross-section, thereby to establish good sealing with the cylindrical surface of the port.

Those annular areas of the portions of the cylindrical members so caused sealingly to engage the casing may be of relatively small radial thickness in order to reduce friction upon reciprocation of the displaceable member.

Figure 1:
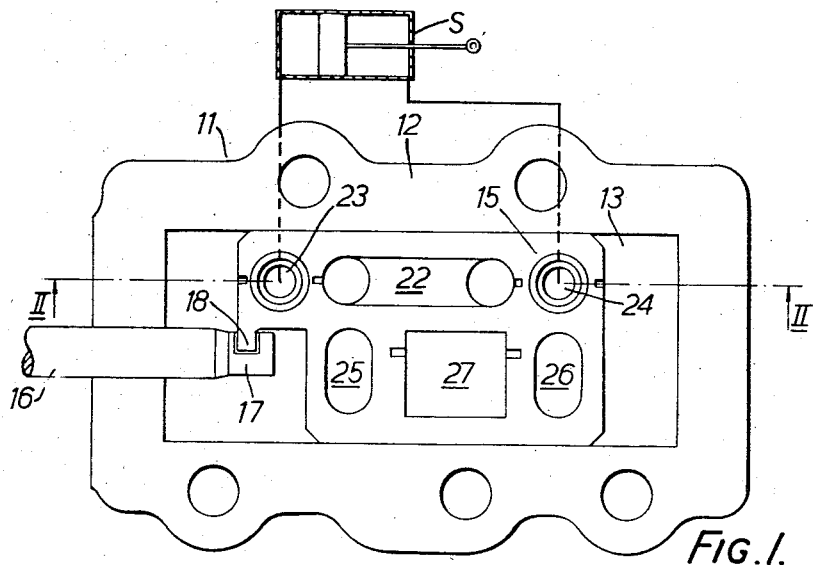
Figure 2:
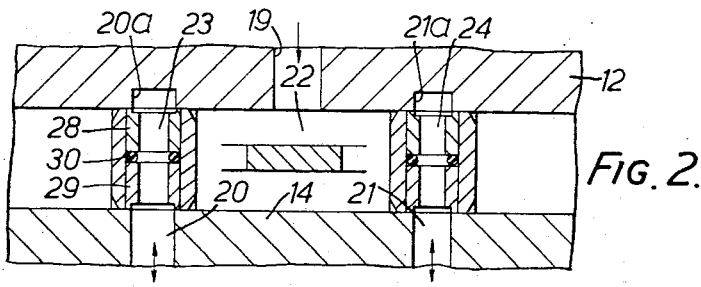
Figure 3:
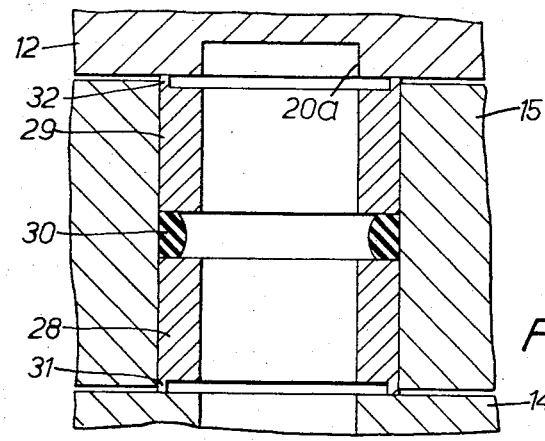

One embodiment of the invention will now be particularly described by way of example with reference to the accompanying diagrammatic drawings, of which, FIGURE 1 is a side elevation of a slide valve with its closure plate removed, FIGURE 2 is a cross-section of a part of the slide valve taken along the line II—II on FIGURE 1, and, FIGURE 3 is an enlarged section of a part of the view shown in FIGURE 2.

Referring to the drawings, a slide valve 11 suitable for use in a fluid-pressure-operated system, in this case a system using hydraulic liquid, comprises a valve casing 12 having an elongated rectangular slide chamber 13 of rectangular cross-section. The chamber 13 is closed by a closure plate 14 and houses a displaceable member 15 also of rectangular cross-section, this member being movable linearly on either side of, and away from, a central neutral position within the chamber 13 linearly, in either direction by means of a control rod 16. The member 15 is shown in its neutral position in FIGURE 1. The control rod 16 is connected to the member by means of a square-hook projection 17 which engages a peg 18 formed on the member 15.

The casing is provided with a pressure liquid supply port 19 and two service ports 20 and 21, the port 19 being placed in communication with a source of liquid under pressure, and the ports 20 and 21 being placed in communication with a service in the form of a double-acting telescopic hydraulic jack S to be operated under the control of the slide valve 11.

The displaceable member 15 includes a central pressure slot 22 cut through the thickness of the member and of such length as to be in permanent registry with the pressure liquid supply port 19 regardless of the position of the member 15 within the chamber 13. The member 15 also includes two auxiliary ports 23 and 24 of circular form also cut through the thickness of the member. When the member is in its neutral position, these auxiliary ports respectively register exactly with the first and second service ports 20 and 21. Opposite these service ports in the casing 12 are blind balance ports 20a and 21a which afford hydraulic balance across the member in the transverse sense.

Balance ports 25 and 26 are provided in the displaceable member 15 on either side of, and in association with, an unloading port 27 also provided therein, these details forming no part of the present invention and mentioned only since they are part of one specific slide valve assembly incorporating the invention.

Referring now more particularly to FIGURES 2 and 3, the ports 23 and 24 are each provided with a pair of cylindrical members 28 and 29 having a sliding fit within the port and urged outwardly of the port into sealing engagement with the appropriate side face of the casing by resilient means in the form of a sealing ring 30 of circular cross-section interposed between them.

Portions 31 and 32 of the cylindrical members 28 and 29, which are in engagement with the appropriate side face of the casing 12, are of such radial thickness with respect to the main portion of the members 28 and 29 as to present annular engaging surfaces, of relatively small area, to the side faces.

The cylindrical members 28 and 29, which therefore provide shear seals for the displaceable member 15 in the region of the ports 23 and 24 and with respect to the casing 12, are of metal, while the sealing rings 30 are of rubber-like material.

By virtue of the portions 31, 32 on the members 28 and 29, a differential area effect is obtained, one end of each member with respect to the other.

Thus when the displaceable member 15 is in its neutral position as shown in the drawings so that the ports 23 and 24 are in exact registry with the ports 20 and 21, and the balance ports 20a and 21a, the pressure obtaining in the ports 20 and 21 and thus in the ports 23 and 24, is applied through the medium of the sealing ring to overbalance the fluid pressure on the portion of the outward face of the respective cylindrical member not in engagement with the adjacent face of the casing. Consequently, an overbalance of the forces is provided in the sealing direction so that a good seal is provided between the portion 31, 32 and the adjacent face of the casing.

The sealing ring 30 serves another purpose in that it seals against the bore of the port 23 or 24.

The dimensions of the cylindrical members 28 and 29 of the displaceable member 15 and of the casing parts 12 and 14 are such that upon assembly, the sealing ring 30 is arranged to fit between the members 28 and 29 with a slight pinch upon it thus maintaining initial contact between the portions 31 and 32 and the appropriate faces of the casing 14 and 12.

In operation of the slide valve, with liquid under pressure delivered to the port 19 and thus into the elongated port 22, when the displaceable member 15 is moved away from its neutral position to the left in the drawing so that the port 22 is in communication with the port 20, liquid under pressure is delivered to one side of the service S while liquid returning from the service and thus present in the port 21 is directed into the right-hand end portion of the chamber 13, discharging therefrom to drain.

The converse occurs when the displaceable member 15 is moved to the right in the drawing away from its neutral position.

The unloader port 27 is provided in order to afford a direct communication between the inlet to the valve and the drain connection of the valve only when the member 15 is in its neutral position. The ports 25 and 26 serve to afford hydraulic balance across the member in the transverse sense. As noted above, these details form no part of the invention and are mentioned only since the specific slide shown herein makes use of such ports.

When the displaceable member 15 is returned by the member 16 to its neutral position, the ports 23 and 24 respectively register with the ports 20 and 21, and 20a and 21a, exactly, and it is in this condition where it is most necessary to provide good sealing. As explained, the cylindrical members 28 and 29 together with the sealing ring 30 operate to maintain this good sealing relationship between the displaceable member 15 and the casing 12.

High friction forces ordinarily characteristic of shear seals are reduced considerably by the counterbored portions of the members 28 and 29 which afford the relatively small area sealing portions 31 and 32.

In the embodiment described it is not practicable to apply such shear seals to every port in the valve and thus they are only used where good sealing is necessary, that is in the region of the service ports when the displaceable member is in its neutral position, whilst a small amount of leakage is permissible at the other ports.

In this way, the valve clearances can be relaxed sufficiently to avoid binding due to thermal expansion and to simplify and cheapen the machining of the displaceable member 15 and the casing 12.

By so providing such a slide valve of rectangular cross-section with shear seals, a valve with a very low leakage rate is obtained and thus is advantageous over valves of the spool type where it has been found extremely difficult to obtain really low leakage operation.

Hitherto, in slide valves either of the spool type or of the rectangular cross-section type, satisfatcory operation has depended upon the maintenance of a very small clearance between the displaceable member and the cooperating faces of the casing. Further, in the case of the slide valve of the rectangular cross-section type it has been necessary hitherto to ensure that the displaceable member and its cooperating faces are kept flat within extremely close limits both before assembly and after tightening of the components together. Also it was necessary, for simplicity of machining of the components, for the stringent conditions of small clearance to be provided all over the cooperating faces of the casing and the displaceable member, whereas in such valves, from the operating standpoint, the leakage is only really required to be very small in two areas of the valve, those being the areas of the two service ports. The latter is the case because suspended loads are maintained in position by resistance to leakage at the service ports of the valve in its neutral position.

With the present invention, however, by providing shear seals only in the region of the two service ports, the essential good sealing at these ports is provided, such provision rendering close machining limits on the cooperable faces of the displaceable member and the casing less important.

Although in the above embodiment the sealing ring interposed between the cylindrical members forming the shear seals has been of circular cross-section, the sealing ring can be of rectangular cross-section.

While specific details of a preferred embodiment of the invention have been provided, it will be evident from the teachings hereof that the sealing ring can be formed from a suitable plastic material, the sealing ring can be made of cruciform cross-section to afford yieldable charatceristics, and the sealing ring can be bonded to the cylindrical members instead of being loosely mounted between the same. Various other alternate arrangements encompassed within the generic concepts will undoubtedly become obvious to those skilled in the art after having the advantage of the teachings hereof.

Although in the embodiment described with reference to the drawings the cylindrical members 28 and 29 have external cylindrical surfaces of constant diameter, in other embodiments these surfaces could be stepped in diameter in order to provide such relative pressure distribution on the end faces of the members as to reduce friction at the sealing surfaces.

The invention is in no way limited to slide valves whose displaceable member or members is or are slidable linearly, as in other embodiments the displaceable member or members could be rotary or semi-rotary, and thus are slidable in arcuate manner between opposed flat surfaces formed on the interior of the slide valve casing.

The invention may with advantage be applied to control valve blocks having a plurality of displaceable members each being communicable with a respective service, one or more such displaceable members incorporating shear seals for the purpose hereinbefore described.

The invention is in no way limited to use in liquid systems as it can with advantage be used in pneumatic or other gaseous systems.

I claim as my invention:

1. A slide valve comprising in combination: a casing having a fluid supply port, a service port, and a balance service port therein; a slide member of rectangular cross-section housed for sliding displacement in the casing to either side of a neutral position, said member including a central pressure slot of such length as to be in permanent registry with said pressure fluid supply port formed in the casing, and also including at least one auxiliary port cut completely through the thickness of the member, said auxiliary port when said member is in its neutral position registering exactly with said service port and also with said balance service port; sealing means provided within said auxiliary port substantially preventing the escape of fluid from the service, auxiliary and balance ports to exhaust when said member is in its neutral position, the operating clearances between said member and the casing being such that when the member is being moved between a neutral position and a position of registry with the service port any flow of fluid to exhaust through said operating clearances can only be of low order; said sealing means including a pair of cylindrical members slidingly mounted in the auxiliary port; and resilient means interposed between the cylindrical members and urging the same in directions outwardly of said auxiliary port into sealing engagement with the adjacent casing surface; said resilient means comprising a sealing ring having sufficient inherent resilience to assure sealing engagement of said cylindrical members with said casing and to establish fluid sealing with the cylindrical surface of the port.

2. A slide valve as claimed in claim 1, wherein the area of the portion of each of said cylindrical members which engages the respective casing surface is of relatively small radial width compared to the radial width thereof adjacent said ring, whereby the fluid pressure forces acting across both cylindrical members, and the force derived from the sealing ring which acts upon both members are together such that inherent balance in the transverse sense is at all times afforded the member of rectangular cross-section by the sealing means, and adequate fluid interface sealing is provided between both members and adjacent casing surfaces, consistent with low interface friction when the member of rectangular cross-section is moved between its neutral and service-selected positions.

References Cited

UNITED STATES PATENTS

| | | | |
|---|---|---|---|
| 2,601,990 | 7/1952 | Holzer | 137—625.64 |
| 2,834,368 | 5/1958 | Gray | 137—271 |
| 2,875,782 | 3/1959 | Lee | 137—625.68 |
| 2,990,853 | 7/1961 | Sharp | 251—283 XR |
| 3,215,163 | 11/1965 | Henderson | 251—175 XR |

FOREIGN PATENTS

| | | |
|---|---|---|
| 1,370,664 | 7/1964 | France. |
| 911,436 | 11/1962 | Great Britain. |

HENRY T. KLINKSIEK, *Primary Examiner.*